US012175570B2

(12) United States Patent
Kozakov et al.

(10) Patent No.: US 12,175,570 B2
(45) Date of Patent: Dec. 24, 2024

(54) CUSTOMIZABLE AVATAR GENERATION SYSTEM

(71) Applicant: Snap Inc., Santa Monica, CA (US)

(72) Inventors: Michael Kozakov, Toronto (CA); Avie Seegobin, Toronto (CA); Mark Anthony Cabuena, Toronto (CA)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/657,286

(22) Filed: Mar. 30, 2022

(65) Prior Publication Data

US 2022/0319078 A1 Oct. 6, 2022

Related U.S. Application Data

(60) Provisional application No. 63/169,083, filed on Mar. 31, 2021.

(51) Int. Cl.
| | |
|---|---|
| *G06T 11/60* | (2006.01) |
| *G06F 40/109* | (2020.01) |
| *G06F 40/20* | (2020.01) |
| *G06N 3/08* | (2023.01) |
| *G06N 7/01* | (2023.01) |
| *G06T 3/40* | (2006.01) |

(52) U.S. Cl.
CPC ............ *G06T 11/60* (2013.01); *G06F 40/109* (2020.01); *G06F 40/20* (2020.01); *G06N 3/08* (2013.01); *G06N 7/01* (2023.01); *G06T 3/40* (2013.01)

(58) Field of Classification Search
CPC ......... G06T 11/60; G06T 3/40; G06F 40/109; G06F 40/20; G06N 7/01; G06N 3/08
See application file for complete search history.

(56) References Cited

U.S. PATENT DOCUMENTS

| | | | |
|---|---|---|---|
| 4,686,649 | A | 8/1987 | Rush et al. |
| 5,689,585 | A | 11/1997 | Bloomberg et al. |
| | | (Continued) | |

FOREIGN PATENT DOCUMENTS

| | | |
|---|---|---|
| CA | 2643980 | 10/2007 |
| CN | 101068971 A | 11/2007 |
| | (Continued) | |

OTHER PUBLICATIONS

Bitmoji (Customize your Bitmoji text on the Bitmoji Chrome Extension, https://www.youtube.com/watch?v=pIXHVwGPuYA, Oct. 16, 2019.) (Year: 2019).*

(Continued)

*Primary Examiner* — Yu Chen
(74) *Attorney, Agent, or Firm* — SCHWEGMAN LUNDBERG & WOESSNER, P.A.

(57) ABSTRACT

Systems, methods, and computer readable media for customizable avatar generation system, where the methods include accessing text data, processing, using at least one processor, the text data to determine first characteristics of the text data, selecting a personalized avatar of a plurality of personalized avatars for the text data based on matching the first characteristics with second characteristics of the plurality of personalized avatars, generating a customized avatar based on the text data and the selected personalized avatar, and causing the customized avatar to be displayed on a display of a computing device.

11 Claims, 14 Drawing Sheets

(56) References Cited

U.S. PATENT DOCUMENTS

| | | | |
|---|---|---|---|
| 5,880,731 A | 3/1999 | Liles et al. |
| 6,023,270 A | 2/2000 | Brush, II et al. |
| 6,223,165 B1 | 4/2001 | Lauffer |
| 6,772,195 B1 | 8/2004 | Hatlelid et al. |
| 6,842,779 B1 | 1/2005 | Nishizawa |
| 7,212,309 B1 | 5/2007 | Sellers et al. |
| 7,342,587 B2 | 3/2008 | Danzig et al. |
| 7,468,729 B1 | 12/2008 | Levinson |
| 7,555,717 B2 | 6/2009 | Seo et al. |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,572,203 B1 | 10/2013 | Kossow et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,152,979 B2 | 10/2015 | Tew et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,456,170 B1 | 9/2016 | Miller et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,639,969 B1 | 5/2017 | Wilson et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,881,403 B2 | 1/2018 | Tyson et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,114 B1 | 6/2018 | Horton et al. |
| 9,990,373 B2 | 6/2018 | Fortkort |
| 10,039,988 B2 | 8/2018 | Lobb et al. |
| 10,049,477 B1 | 8/2018 | Kokemohr et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,169,897 B1 | 1/2019 | Geiger et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,269,164 B1 | 4/2019 | Song et al. |
| 10,270,983 B1 | 4/2019 | Van Os et al. |
| 10,360,708 B2 | 7/2019 | Bondich et al. |
| 10,362,219 B2 | 7/2019 | Wilson et al. |
| 10,444,938 B1 | 10/2019 | Bhalerao et al. |
| 10,454,857 B1* | 10/2019 | Blackstock ............. H04L 51/52 |
| 10,475,225 B2 | 11/2019 | Park et al. |
| 10,504,266 B2 | 12/2019 | Blattner et al. |
| 10,573,048 B2 | 2/2020 | Ni et al. |
| 10,586,369 B1 | 3/2020 | Roche et al. |
| 10,607,065 B2 | 3/2020 | Milman et al. |
| 10,657,701 B2 | 5/2020 | Osman et al. |
| 10,659,405 B1 | 5/2020 | Chang et al. |
| 10,802,683 B1 | 10/2020 | Griffin et al. |
| 10,990,246 B1* | 4/2021 | Law ..................... G06V 40/103 |
| 11,307,732 B1 | 4/2022 | Bischoff |
| 11,308,674 B2* | 4/2022 | Xu ........................ G06T 13/80 |
| 11,361,521 B2 | 6/2022 | Lee et al. |
| 11,380,077 B2 | 7/2022 | Scapel et al. |
| 11,941,227 B2 | 3/2024 | Kotsopoulos et al. |
| 2001/0049596 A1 | 12/2001 | Lavine et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0008177 A1 | 1/2006 | Chermont et al. |
| 2006/0217979 A1 | 9/2006 | Pahud et al. |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0142851 A1 | 6/2010 | Conlon |
| 2010/0162149 A1 | 6/2010 | Sheleheda et al. |
| 2010/0203968 A1 | 8/2010 | Gill et al. |
| 2010/0227682 A1 | 9/2010 | Reville et al. |

(56) References Cited

U.S. PATENT DOCUMENTS

| | | |
|---|---|---|
| 2010/0313107 A1 | 12/2010 | Hikida |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0239143 A1 | 9/2011 | Ye et al. |
| 2011/0248992 A1 | 10/2011 | Van et al. |
| 2011/0296324 A1 | 12/2011 | Goossens et al. |
| 2011/0313756 A1 | 12/2011 | Connor |
| 2012/0092435 A1 | 4/2012 | Wohlert |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0272160 A1 | 10/2012 | Spivack et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0298084 A1 | 11/2013 | Spivack et al. |
| 2013/0332850 A1 | 12/2013 | Bovet et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0306989 A1 | 10/2014 | Doubleday et al. |
| 2015/0172246 A1 | 6/2015 | Velummylum et al. |
| 2015/0206349 A1 | 7/2015 | Rosenthal et al. |
| 2016/0134840 A1 | 5/2016 | Mcculloch |
| 2016/0139761 A1 | 5/2016 | Grosz et al. |
| 2016/0156584 A1 | 6/2016 | Hum et al. |
| 2016/0234149 A1 | 8/2016 | Tsuda et al. |
| 2016/0291822 A1 | 10/2016 | Ahuja et al. |
| 2017/0046065 A1 | 2/2017 | Zeng et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0005420 A1 | 1/2018 | Bondich et al. |
| 2018/0025219 A1 | 1/2018 | Baldwin et al. |
| 2018/0026925 A1* | 1/2018 | Kennedy ............... H04W 4/02 715/753 |
| 2018/0047200 A1 | 2/2018 | O'hara et al. |
| 2018/0077095 A1 | 3/2018 | Deyle et al. |
| 2018/0091732 A1 | 3/2018 | Wilson et al. |
| 2018/0113587 A1 | 4/2018 | Allen et al. |
| 2018/0115503 A1 | 4/2018 | Baldwin et al. |
| 2018/0249200 A1* | 8/2018 | Wang ............... H04N 21/4788 |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0069007 A1 | 2/2019 | Bodas et al. |
| 2019/0122411 A1* | 4/2019 | Sachs ..................... G06T 7/90 |
| 2019/0138174 A1 | 5/2019 | Deets, Jr. et al. |
| 2019/0158735 A1 | 5/2019 | Wilson et al. |
| 2019/0188920 A1 | 6/2019 | Mcphee et al. |
| 2019/0250934 A1 | 8/2019 | Kim et al. |
| 2019/0287287 A1 | 9/2019 | Bondich et al. |
| 2019/0339847 A1* | 11/2019 | Scapel ................. G06T 13/80 |
| 2020/0004829 A1* | 1/2020 | Denton ............... H04L 67/306 |
| 2020/0034033 A1* | 1/2020 | Chaudhri ............ G06F 3/04842 |
| 2020/0213680 A1* | 7/2020 | Ingel ................ H04N 21/44008 |
| 2020/0272306 A1 | 8/2020 | Barkman et al. |
| 2020/0402304 A1 | 12/2020 | Hwang et al. |
| 2020/0409533 A1 | 12/2020 | Blackstock et al. |
| 2021/0042978 A1* | 2/2021 | Zheng ................. G06F 40/109 |
| 2021/0117667 A1 | 4/2021 | Mehra et al. |
| 2021/0126883 A1* | 4/2021 | Choi ................... G06F 3/0484 |
| 2021/0176197 A1 | 6/2021 | Al Majid et al. |
| 2021/0216203 A1 | 7/2021 | Wu et al. |
| 2021/0232632 A1* | 7/2021 | Howard .............. G06F 16/9038 |
| 2021/0342785 A1 | 11/2021 | Mann et al. |
| 2021/0343030 A1 | 11/2021 | Sagonas et al. |
| 2021/0375023 A1* | 12/2021 | Kothari .................. G06V 20/20 |
| 2022/0070385 A1 | 3/2022 | Van Os et al. |
| 2022/0122258 A1 | 4/2022 | Kumawat et al. |
| 2022/0301244 A1 | 9/2022 | Kumawat |
| 2022/0319075 A1 | 10/2022 | Hu et al. |
| 2023/0004260 A1 | 1/2023 | Kotsopoulos et al. |
| 2023/0215083 A1* | 7/2023 | Hoffman-John ........ G06T 15/50 345/419 |
| 2023/0281940 A1* | 9/2023 | Shen ..................... G06V 20/20 345/419 |
| 2024/0012537 A1 | 1/2024 | Kotsopoulos et al. |

FOREIGN PATENT DOCUMENTS

| | | |
|---|---|---|
| CN | 101765840 | 6/2010 |
| CN | 102046249 A | 5/2011 |
| CN | 109863532 | 6/2019 |
| CN | 110168478 | 8/2019 |
| CN | 117203676 | 12/2023 |
| CN | 117597690 | 2/2024 |
| EP | 1549031 | 6/2005 |
| EP | 2184092 | 5/2010 |
| JP | H07137377 | 5/1995 |
| JP | 2001230801 | 8/2001 |
| JP | 2005202909 A | 7/2005 |
| JP | 2005216181 | 8/2005 |
| JP | 2008090449 | 4/2008 |
| JP | 5497931 | 3/2014 |
| JP | 2019161440 | 9/2019 |
| KR | 20060048736 | 5/2006 |
| KR | 101445263 | 9/2014 |
| KR | 20220032444 | 3/2022 |
| WO | 2003094072 | 11/2003 |
| WO | 2004095308 | 11/2004 |
| WO | 2006107182 | 10/2006 |
| WO | 2007134402 | 11/2007 |
| WO | 2012116241 | 8/2012 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | 2022213088 | 10/2022 |
| WO | 2023279028 | 1/2023 |

OTHER PUBLICATIONS

Bitmoji support (Customize Text on Bitmoji Stickers, Wayback machine https://web.archive.org/web/20200926160053/https://support.bitmoji.com/hc/en-us/articles/360034632291-Customize-Text-on-Bitmoji-Stickers, Sep. 26, 2020.) (Year: 2020).*

"U.S. Appl. No. 17/303,357, Non Final Office Action mailed Oct. 13, 2021", 13 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"U.S. Appl. No. 17/303,357 Response Filed Jan. 13, 2022 to Non Final Office Action mailed Oct. 13, 2021,", 10 pgs.

"U.S. Appl. No. 17/303,357, Final Office Action mailed Mar. 15, 2022", 16 pgs.

"U.S. Appl. No. 17/303,357, Response filed Oct. 26, 2022 to Non Final Office Action mailed Jul. 26, 2022", 10 pgs.

(56) References Cited

OTHER PUBLICATIONS

"International Application Serial No. PCT/US2022/073265, International Search Report mailed Oct. 26, 2022", 4 pgs.
"International Application Serial No. PCT/US2022/073265, Written Opinion mailed Oct. 26, 2022", 7 pgs.
"U.S. Appl. No. 17/303,357, Final Office Action mailed Jan. 18, 2023", 16 pgs.
Keeler, Alice, "Custom Text with Bitmoji", Teacher Tech with Alice Keeler, [Online] Retrieved from the Internet: <URL: https://web.archive.org/web/20200918085422/https://alicekeeler.com/2020/08/27/custom-text-with-bitmoji/>, (Aug. 27, 2020), 8 pgs.
"U.S. Appl. No. 17/303,357, Response filed Jun. 15, 2022 to Final Office Action mailed Mar. 15, 2022", 9 pgs.
"International Application Serial No. PCT/US2022/071441, International Search Report mailed Jul. 4, 2022", 5 pgs.
"International Application Serial No. PCT/US2022/071441, Written Opinion mailed Jul. 4, 2022", 10 pgs.
"U.S. Appl. No. 17/303,357, Non Final Office Action mailed Jul. 26, 2022", 18 pgs.
Gupta, Tanmay, "Imagine This! Scripts to Compositions to Videos", Pattern Recognition: 5th Asian Conference, ACPR 2019, Auckland, New Zealand, Springer Selected Papers, Part II, Springer International Publishing, Cham, [Online] Retrieved from the internet: <https://arxiv.org/pdf/1804.03608.pdf>, (Nov. 26-29, 2019), 22 pgs.
Hou, Jin, "Humanoid Personalized Avatar Through Multiple Natural Language Processing", [Online] Retrieved from the internet: <http://citeseerx.ist.psu.edu/viewdoc/download?doi=10.1.1.353.879&rep=rep1&type=pdf>, (Nov. 20, 2009), 6 pgs.
"Application Serial No. 17 447, 121, Non Final Office Action mailed Mar. 2, 2023", 12 pgs.
"Application Serial No. 17 303,357, Response filed Apr. 18, 2023 to Final Office Action mailed Jan. 18, 2023", 9 pgs.
"Application Serial No. 17 447, 121, Response filed Jun. 1, 2023 to Non Final Office Action mailed Mar. 2, 2023", 11 pgs.
"Application Serial No. 17 447, 121, Examiner Interview Summary mailed Jun. 5, 2023", 2 pgs.
"Application Serial No. 17 447, 121, Notice of Allowance mailed Jun. 23, 2023", 13 pgs.
"Application Serial No. 17 303,357, Non Final Office Action mailed Jul. 5, 2023", 16 pgs.
"Application Serial No. 17 303,357, Response filed Sep. 19, 2023 to Non Final Office Action mailed Jul. 5, 2023", 8 pgs.
"International Application Serial No. PCT US2022 071441, International Preliminary Report on Patentability mailed Oct. 12, 2023", 12 pgs.
"Application Serial No. 17 303,357, Final Office Action mailed Nov. 6, 2023", 19 pgs.
"Application Serial No. 17 447, 121, Notice of Allowance mailed Nov. 13, 2023", 7 pgs.
Berman, A Gottumukkala, "iCanTrace: Avatar Personalization Through Selfie Sketches", Inspiring Students with Digital Ink. Human-Computer Interaction Series, https: link.springer.com chapter 10.1007 978-3-030-17398-2_11, (2019), 11 pgs.
Keeler, "Custom Text with Bitmoji", YouTube screenshot, Wayback Machine, (2020).
"International Application Serial No. PCT/US2022/073265, International Preliminary Report on Patentability mailed Jan. 11, 2024", 9 pgs.
"U.S. Appl. No. 17/303,357, Response filed Jan. 23, 2024 to Final Office Action mailed Nov. 6, 2023", 11 pgs.
"U.S. Appl. No. 17/303,357, Examiner Interview Summary mailed Jan. 25, 2024", 2 pgs.
"U.S. Appl. No. 17/303,357, Advisory Action mailed Feb. 12, 2024", 5 pgs.
"U.S. Appl. No. 17/303,357, Response filed Feb. 27, 2024 to Advisory Action mailed Feb. 12, 2024", 11 pgs.
"U.S. Appl. No. 17/303,357, Non Final Office Action mailed Mar. 20, 2024", 19 pgs.
"U.S. Appl. No. 17/303,357, Response filed Jun. 18, 2024 to Non Final Office Action mailed Mar. 20, 2024", 10 pgs.
"Chinese Application Serial No. 202280046841.9, Office Action mailed May 9, 24", w/ English translation, 17 pgs.
"U.S. Appl. No. 18/371,391, Non Final Office Action mailed Jul. 25, 2024", 20 pgs.
"Accessing media includes storing media", Date-restricted Google Search result, retrieved Jul. 19, 2024, (2021), 1 pg.
"Media server: why do you need it and how to set it up?", [Online]. Retrieved from the Internet: <URL: https://kingservers.com/blog/en/media-server/>, retrieved Jul. 19, 2024, (Apr. 23, 2021), 3 pgs.
"U.S. Appl. No. 17/303,357, Notice of Allowance mailed Aug. 1, 2024", 8 pgs.

\* cited by examiner

CUSTOMIZABLE AVATAR GENERATION SYSTEM

PRIORITY CLAIM

This application claims the benefit of priority under 35 USC 119(e) to U.S. Provisional Patent Application Ser. No. 63/169,083, filed Mar. 31, 2021, which is incorporated herein by reference in its entirety.

TECHNICAL FIELD

Examples of the present disclosure relate generally to customized avatar generation within a messaging system. More particularly, but not by way of limitation, examples of the present disclosure relate to generating customized avatars based on personalized avatars of a user and text input by the user.

BACKGROUND

Messaging systems comprise tens or hundreds of millions of users. Each user in a messaging system can transmit media content items between members of his or her individual social networking or to individuals outside of their social network.

Users increasingly share media content items, such as electronic images, animations, or videos with each other. These media content items are typically personalized, and thus, reflect a demand to personalize media content items. However, often it can be time consuming or frustrating for the user to generate customized media content items.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
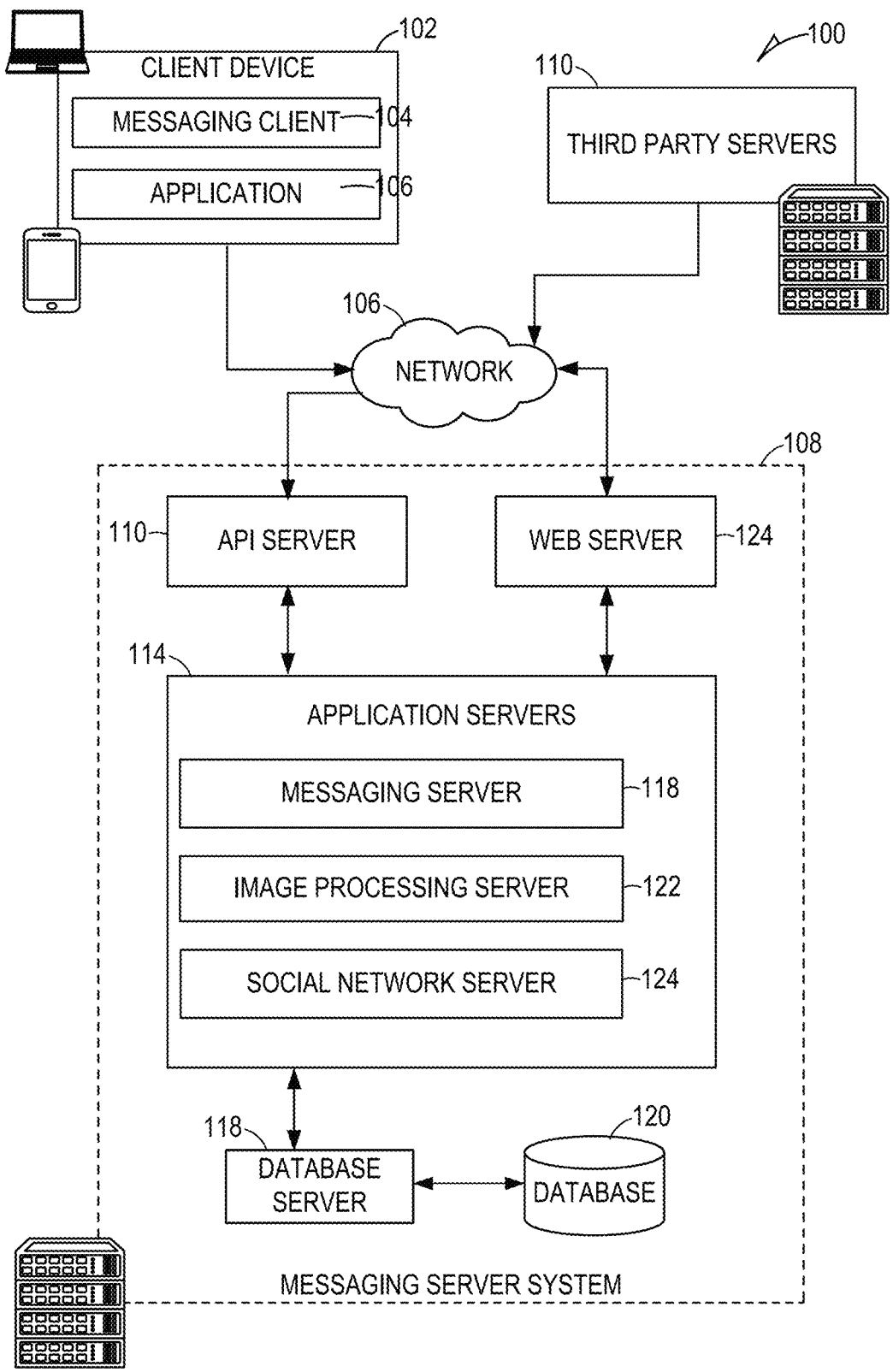
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

In messaging systems, a digital representation of a user can be created based on the user's persona or likeness. The digital representation, known as an avatar, can be rendered in two-dimensional or three-dimensional forms and be integrated into virtual gaming, social media messaging platforms, or interactive software applications. The avatars are designed on the backend and stored in an image database for retrieval by the user for individual user configurations such as adding features to resemble the user's likeness.

A technical problem is how to generate and match personalized avatars with text messages the user writes. In some examples, the technical problem is addressed by generating personalized avatars using neural networks, which may be generative neural networks (GNNs) trained using a generative adversarial network (GAN) that generate personalized avatars for various characteristics based on a base avatar of the user. The personalized avatars include a text placement area that includes various limitations or characteristics of the text such as a font type, a number of letters or words, a font size, and so forth. In some examples, the user creates their own personalized avatars and the NNs determine the characteristics of the user created personalized avatars.

The personalized avatars are matched with text messages the user writes based on determining characteristics of the text being matched with the characteristics of the personalized avatars. In some examples, the characteristics of the text are determined using NNs trained to determine probabilities that the text message has each of the characteristics of the personalized avatar. The characteristics include various properties of the text itself such as a font, font size, special characters, a mood, and so forth. The characteristics additionally include upper-level characteristics of the text such as whether the text message is a greeting, a holiday good wishes message, and so forth. The text and personalized avatar are matched based on a weighted sum of how well the characteristics match. Some characteristics must match exactly or be able to be accommodated such as a number of words or characters that the personalized avatar can accommodate.

A matching system selects one more of a plurality of matching personalized avatars and customizes each matching personalize avatar by adding the text message to the text area of the personalized avatar to generate customized avatars. The customized avatars are presented to the user as an option to select a customized avatar to include in a message to another user or for another use within another application such as gaming, virtual reality interaction, and so forth.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
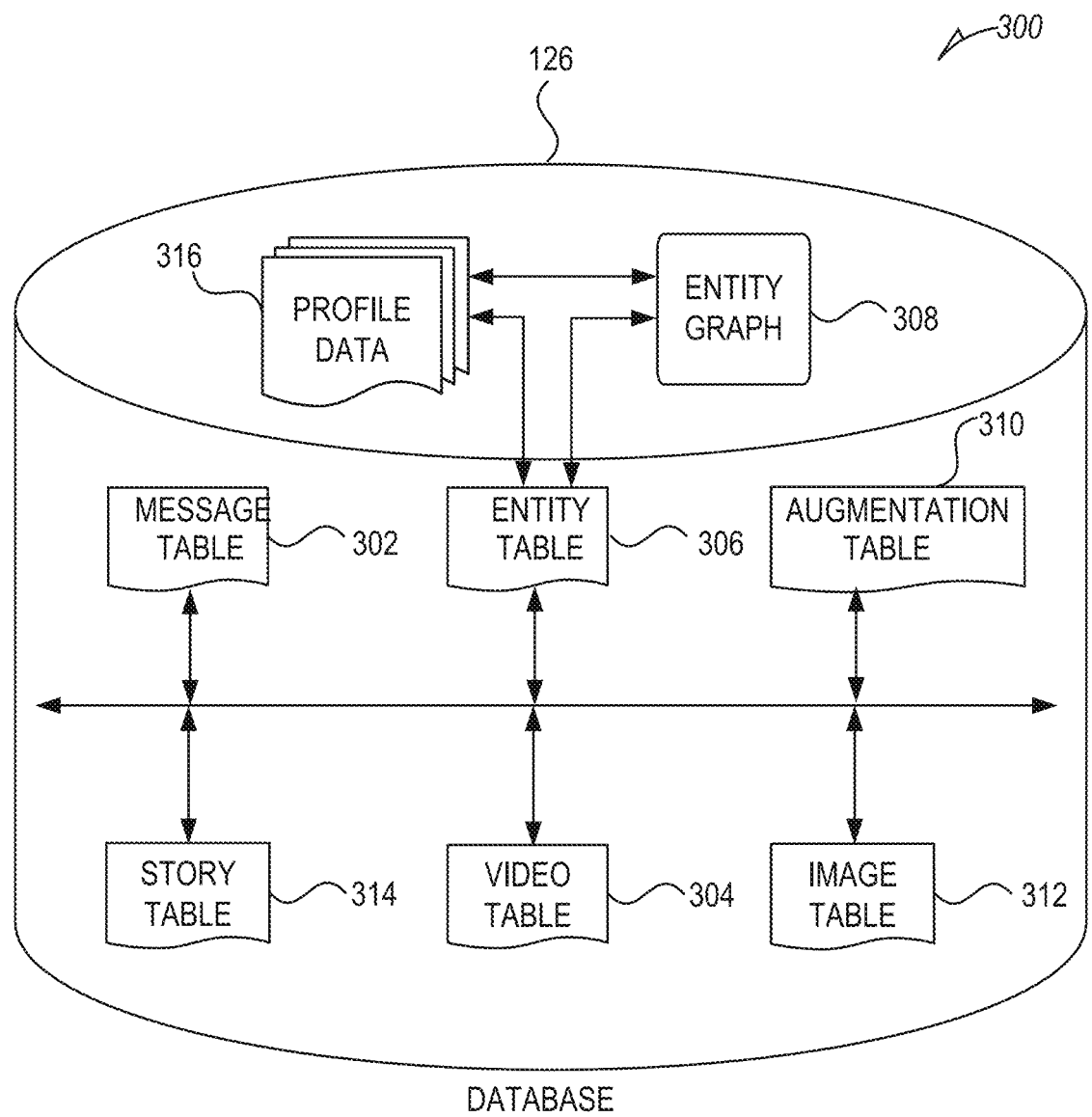
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104, and, in some examples, no or limited portions of the small-scale application can be accessed outside of the messaging client 104. The small-scale application can be launched by the messaging client 104 receiving from a third-party server 110 for example, a markup-language document associated with the small-scale application and processing such a document.

In response to determining that the external resource is a locally installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
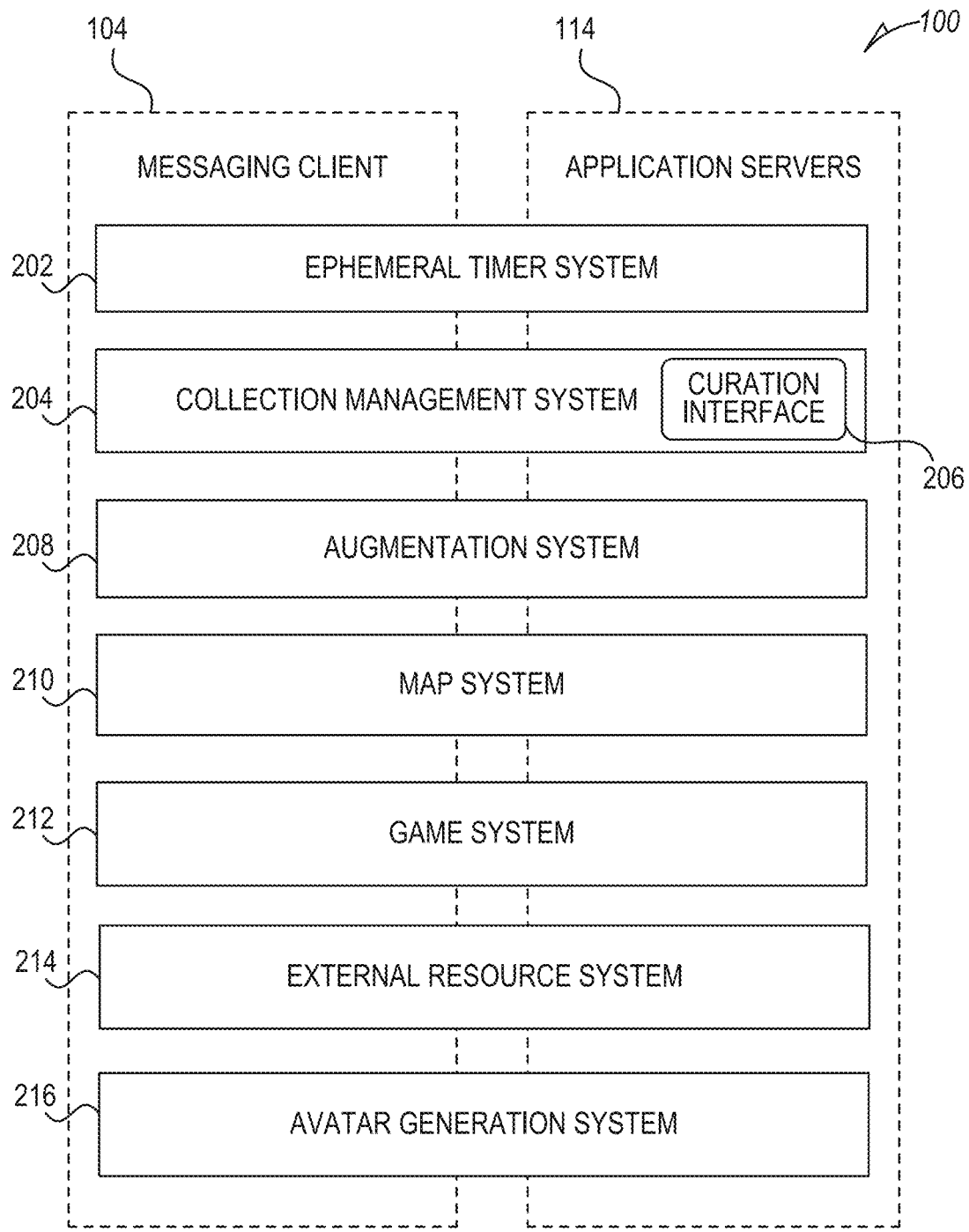
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, an external resource system 214, and an avatar generation system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The avatar generation system 216 provides functions, operations, and routines for generating customized avatars that include integrated user input text data entered by a user in an application such as a messaging application. In some examples, the avatar generation system 216 analyzes the user input text data and identifies characteristics associated with the user input text data. In one example, characteristics that are associated with the user input text data include font type, font spacing, font size, amount of text lines, grammar and syntax, text data language, letter spacing, various meanings such as holiday, greeting, and so forth.

In examples, the avatar generation system 216 retrieves and analyzes personalized avatars generated and stored in image table 312 of database 126 or elsewhere and identifies characteristics that are associated with the personalized avatars. In some examples, characteristics that are associated with the personalized avatars include positioning within an image frame, alignment, orientation, width, height, length, resolution, color scheme, as well as characteristics regarding text areas associated with the personalized avatars. The characteristics associated with the text data and the personalized avatars is discussed further in conjunction with FIG. 5. The avatar generation system 216 calculates a weighted matched combination by comparing and determining which characteristics associated with the personalized avatars are compatible with the characteristics associated with the user input data.

Once the weighted matched combination is determined, using the weighted matched combination, the avatar generation system 216 identifies a subset of personalized avatars within the analyzed personalized avatars that contain compatible characteristics with the user input text data characteristic in order to generate and render the user input text data into the subsets of personalized avatars. For instance, if the user inputs the phrase "hello leo" in all capital letters, with no spacing, one line, and standard font, the avatar generation system 216 will compare and identify a subset of personalized avatars with characteristics that match the user input text data characteristics for integrating the phrase "hello leo" into the personalized avatar to generate customized avatar that includes the phrase "hello leo" in the personalized avatar.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data and avatar data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user).

A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304. In another example, the image table 312 stores personalized avatars, digital icons, media content items, media overlay icons, three-dimensional (3D) animation graphics and objects that are created by a content creator.

The personalized avatars further include descriptive characteristics, a plurality of personalized avatar segments, which may also be referred to as avatar characteristics that include components and characteristics relating to the user's avatar digital likeness, image, and personality. For example, once a creator generates a personalized avatar with a combination of avatar characteristics, the personalized avatar is stored in image table 312 for retrieval. In another example, additional personalized avatar characteristics include avatar positioning within an image frame, avatar alignment, avatar orientation, avatar width, avatar height, avatar length, avatar resolution, and avatar color scheme.

Data Communications Architecture

Figure 4:
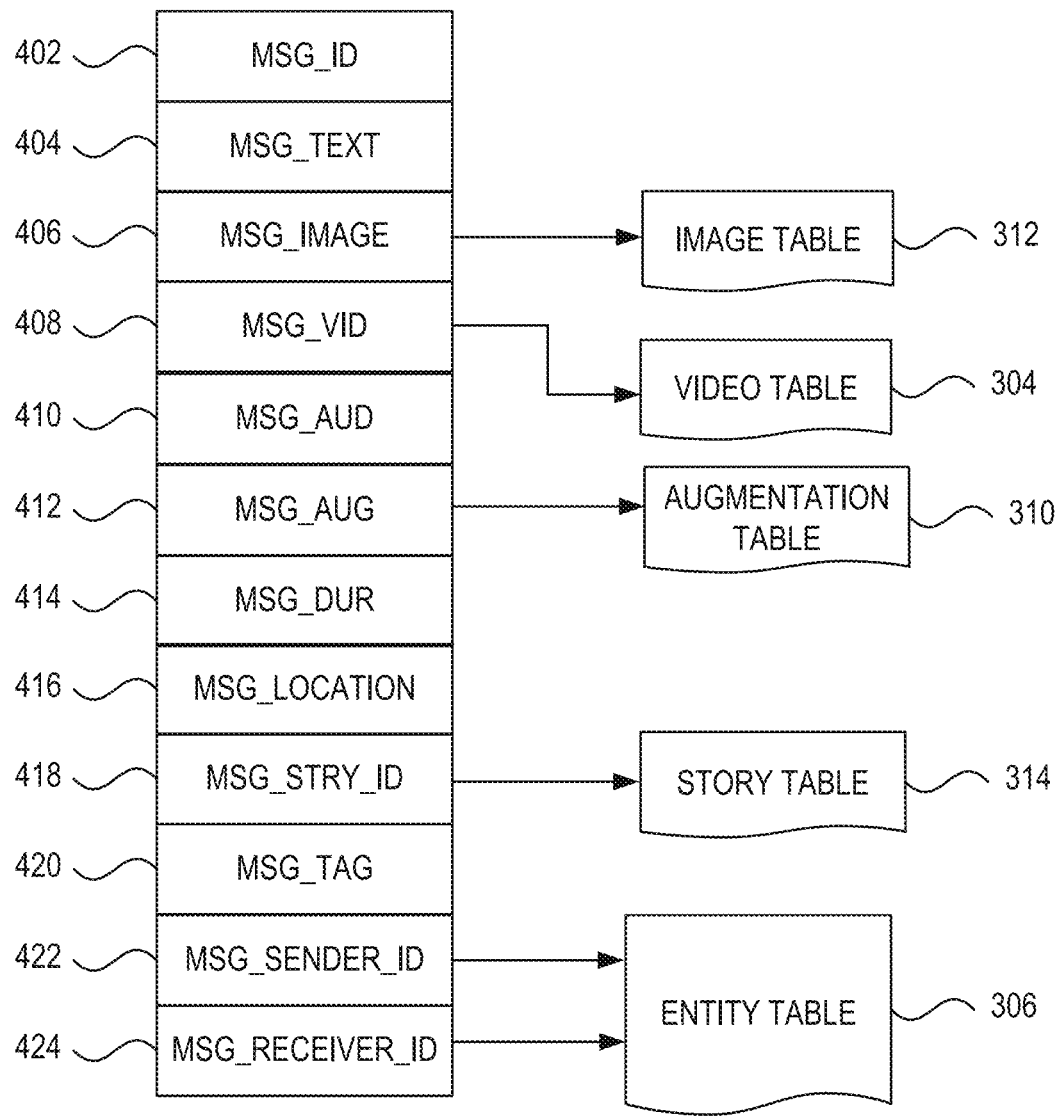
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:
  message identifier 402: a unique identifier that identifies the message 400.
  message text payload 404: text, to be generated by a user via a user interface of the client device 102, and that is included in the message 400.
  message image payload 406: image data, captured by a camera component of a client device 102 or retrieved from a memory component of a client device 102, and that is included in the message 400. Image data for a sent or received message 400 may be stored in the image table 312.
  message video payload 408: video data, captured by a camera component or retrieved from a memory component of the client device 102, and that is included in the message 400. Video data for a sent or received message 400 may be stored in the video table 304.
  message audio payload 410: audio data, captured by a microphone or retrieved from a memory component of the client device 102, and that is included in the message 400.
  message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
  message duration parameter 414: parameter value indicating, in seconds, the amount of time for which content of the message (e.g., the message image payload 406, message video payload 408, message audio payload 410) is to be presented or made accessible to a user via the messaging client 104.
  message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
  message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
  message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
  message sender identifier 422: an identifier (e.g., a messaging system identifier, email address, or device identifier) indicative of a user of the Client device 102 on which the message 400 was generated and from which the message 400 was sent.
  message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Avatar Generation System

Figure 5:
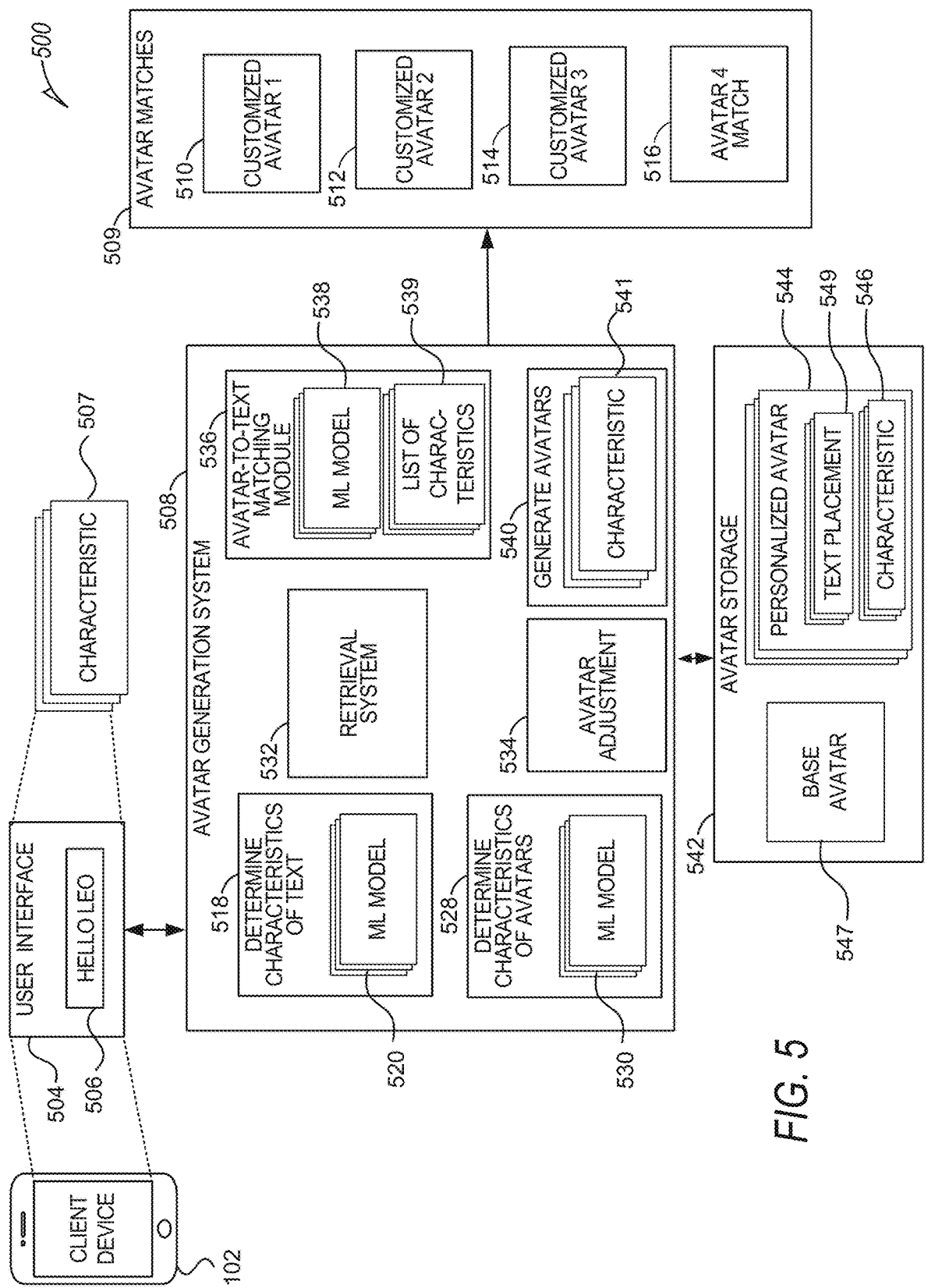
FIG. 5 illustrates a diagrammatic representation of the details of a system for avatar generation in accordance with some examples.

FIG. 5 illustrates a diagrammatic representation of the details of a system 500 for avatar generation in accordance with some examples. A user (not illustrated) enters text data 506 into a user interface 504. For example, the user interface 504 is for entering content that includes letters, numbers, or special characters to be sent to another user separately or included in a media content item, ephemeral message, content collection, or ephemeral content collection. For example, the user of client device 102 enters text data "hello leo" and sends an ephemeral message to another user of another client device 102 via the messaging system 100.

The avatar generation system 508 takes the text data 506 and generates avatar matches 509 based on personalized avatars 544 that are stored in the avatar storage 542. The characteristics 507 of the text data 506 include case of the letters, spacing, number of lines, font type, font size, font spacing, number of lines of text, special characters, icons, grammar, syntax, meaning of the text, phrases, titles, slogans, action, mood, emotion, greeting, sentiment, actions, events, places, objects, and so forth. The emotion or sentiment includes happy, excited, sad, weirded out, thoughtful, angry, excited, disappointed, gob smacked, and so forth. The greeting includes hello, bye, and so forth. The action includes send an email, call me, and so forth.

The machine learning (ML) model 520 takes as input the text data 506 and outputs characteristics 507. In some examples, the ML model 520 is a neural network (NN) that is trained with sets of text data that has a characteristic 507 in order to determine whether the text data 506 has the characteristic 507. For example, for a characteristic 507 such as happy, the text data 506 in a training set is comprised of thousands of words, phrases, sentences, and icons that express happiness. Each of the characteristics 507 may include a corresponding NN to determine if the text data 506 can be characterized as having that characteristic 507. In some examples, the determine characteristics of text 518 outputs a number from 0, which means the text data 506 does not have the characteristic, to 1, which means the text data 506 has the characteristic. Some of the characteristics 507 are a value such as a number of words.

Figure 7:
FIG. 7 illustrates an example of a user interface depicting a base avatar being displayed by client device in accordance with some examples.

The determine characteristics of avatars 528 module determines characteristics of avatars such as the base avatar 547 and the personalized avatars 544. The base avatar 547 is a base avatar of a person such as the user of the client device 102. For example, the base avatar 706 of FIG. 7 illustrates the user of the client device and is discussed in further detail below. The avatars comprise one or more of the following: an image, a video, a digital photo, a content collection, a virtual reality digital representation, a mixed reality digital representation, a mixed reality graphical representation, or a three-dimensional digital representation.

The personalized avatar 544 comprises a text placement 549 area and an avatar area. The personalized avatars 544 are variations of the base avatar 547, in accordance with some examples. In some examples, the generate avatars 540 module generates the personalized avatars 544 from the base avatar 547. For example, in some examples, the generate avatar 540 module utilizes a generative adversarial network (GAN) to train neural networks (NN) to generate the personalized avatars 544 where the base avatar 547 and a characteristic 541 is input to the GAN NN and the GAN NN generates a personalized avatar 544 that has that characteristic 541. The GAN NN is trained to generate different versions of personalized avatars 544 from the base avatar 547. In some examples, a set of avatars are used to train the GAN NN to generate a personalized avatar 544 from a base avatar 547 with a characteristic 541. The same or a similar set of avatars are used to train the ML model 530 of the determine characteristics of avatars 528 module to identify characteristics 546 of personalized avatars 544 that are edited or created differently than by the GAN NN. Additionally, the characteristics 541 correspond to characteristics 507, in accordance with some examples.

For example, the characteristics 546 may be the characteristics 507 included above both for the text placement 549 area and the avatar of the personalized avatar 544 as well as additional characteristics that are particular to the avatar portion of the personalized avatar 544 such as an avatar positioning, an avatar width, an avatar height, an avatar orientation, an avatar rotation, an avatar frame bounding box, and so forth. Additionally, the user may custom design a personalized avatar 544 and associate characteristics 546 with the personalized avatar 544 or the determine characteristics of avatars 528 module will determine the characteristics 546 of the personalized avatar 544. The avatars have an avatar frame boundary bound box, which enables scaling the avatar frame boundary as disclosed in conjunction with FIG. 10.

The avatar-to-text matching module 536 matches the characteristics 507 with the characteristics 546 of the personalized avatar 544. The avatar-to-text matching module 536 determines whether the text data 506 will fit within the text placement 549 area of the personalized avatar 544. In an example, the avatar-to-text matching module 536 calculates a weighted matched combination by comparing and determining a weighted factor scale which characteristics 546 associated with the personalized avatars are compatible with the characteristics 507 associated with the user input text data 506. For example, the determine characteristics of text 518 determines that the text data 506 has seven characteristics 507. The avatar-to-text matching module 536 determines for each of the seven characteristics 507 a measure from 0 to 1 of whether the personalized avatar 544 has the characteristic 507. Some characteristics 507 are given greater weight.

For example, a mood characteristic 507 is given a greater weight than a font type characteristic since an incorrect mood would likely not be an acceptable personalized avatar 544 to the user. The avatar-to-text matching module 536 uses ML model 538 to determine a similarity between the characteristics 507 of the text data 506 and the characteristics 546 of the personalized avatar 544, in accordance with some examples. The ML model 538 is a NN, in accordance with some examples, that is trained with a ground truth based on pairs of text data 506 with characteristics 507 and personalized avatars 544 with characteristics 546 where the ground truth indicates a similarity number from 0 to 1 for each of the pairs.

The avatar-to-text matching module 536 checks whether the text data 506 will fit within a text placement 549 area of the personalized avatar 544. The avatar-to-text matching module 536 uses avatar adjustment 534 to resize the text placement 549 and/or the avatar of the personalized avatar 544 to accommodate the text data 506. The text placement 549 area has characteristics 546 that are used by avatar-to-text matching module 536 to select avatar matches 509. The avatar-to-text matching module 536 inserts the text data 506 into the text placement 549 area.

In some examples, the avatar-to-text matching module 536 generates avatar matches 509 based on the personalized avatars 544 that best match the text data 506. For example, the text data 506 is typically composed of a number of words, and optionally other characters and icons, the avatarto-text matching module 536 matches the size and number of words with the text placement 549 area of the personalized avatar 544 to determine if the text data 506 can be placed within the text placement 549 area. The text placement 549 area often has customized fonts and letters. For example, referring to FIG. 10, the word "test" may be replaced with another word that is similar in the number of letters as "test". The words "font here" may be replaced by two words that have a similar number of letters as the words "font here". The words "font here" may be a font that jumps up and down. The avatar-to-text matching module 536 first filters the personalized avatars 544 to include only personalized avatars 544 where the text placement 549 area can accommodate the text data 506. The avatar-to-text matching module 536 uses the avatar adjustment 534 module to check whether the text placement 549 area can be adjusted to accommodate the text data 506 and includes those personalized avatars 544 where the text placement 549 area can be adjusted to accommodate the text data 506. For example, the text placement 549 area may be expanded to include additionally letters of words.

The avatar-to-text matching module 536 then performs matching only on those personalized avatars 544 where the text placement 549 area can accommodate the text data 506. In some examples, the avatar-to-text matching module 536 performs the matching and then selects at least one personalized avatar 544 that has a characteristic 546 that matches a list of characteristics 539. For example, the list of characteristics 539 may include sentiments such as thoughtful, angry, excited, and so forth. The avatar-to-text matching module 536 then selects one personalized avatar 544 for each of the sentiments, which may be selected as the personalized avatar 544 with a highest matching score that has each of the sentiments. The avatar matches 509 includes customized avatars where each can accommodate the text data 506 and there is one customized avatar for each of the characteristics 546 in the list of characteristics 539.

Figure 8:
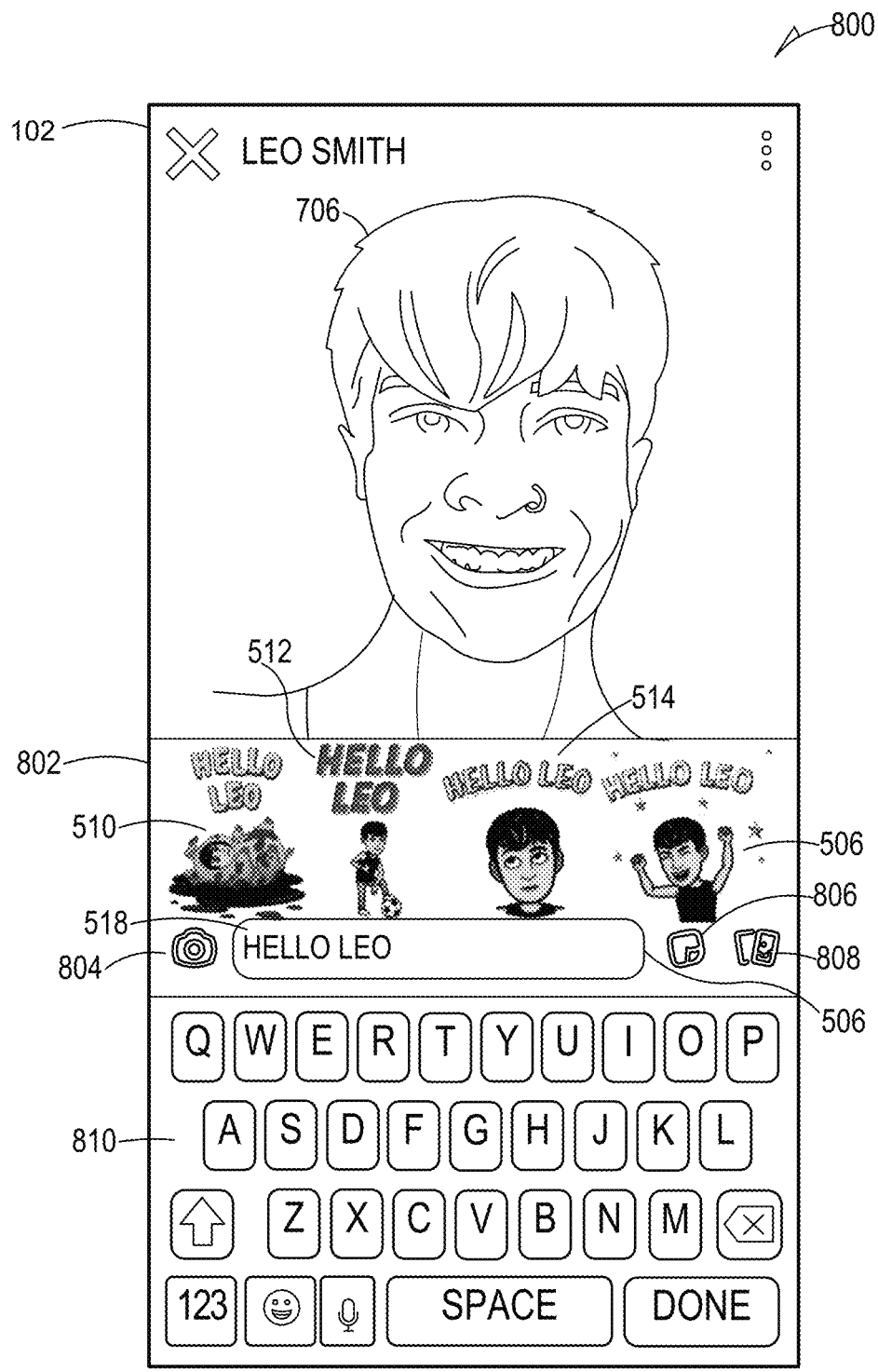
FIG. 8 illustrates an example of a user interface depicting an avatar interface and customized avatars being displayed by a client device in accordance with some examples.

For example, the text data 506 may be "hello leo" as in FIG. 8. Referring to FIGS. 5 and 8, the avatar-to-text matching module 536 generates the avatar matches 509, which include customized avatar 1 510 that is "hello leo" with a silly personalized avatar, customized avatar 2 512 that is "hello leo" with a sporty personalized avatar, customized avatar 3 514 that is "hello leo" with a thoughtful personalized avatar, and customized avatar 4 516 that is "hello leo" with an excited personalized avatar.

The avatar matches 509 include one to a threshold number, such as twenty of avatar matches 509. As illustrated, customized avatar 1 510, customized avatar 2 512, customized avatar 3 514, and customized avatar 4 516 are generated by the avatar-to-text matching module 536.

The retrieval system 532 retrieves the personalized avatars 544 from a storage system. For example, the personalized avatars 544 are stored in a storage system of the client device 102 and/or the image table 312. The messaging system 100 is queried by the client device 102 to retrieve the personalized avatars 544, in accordance with some examples. The operation of avatar adjustment 534 is discussed in conjunction with FIG. 10.

Figure 6:
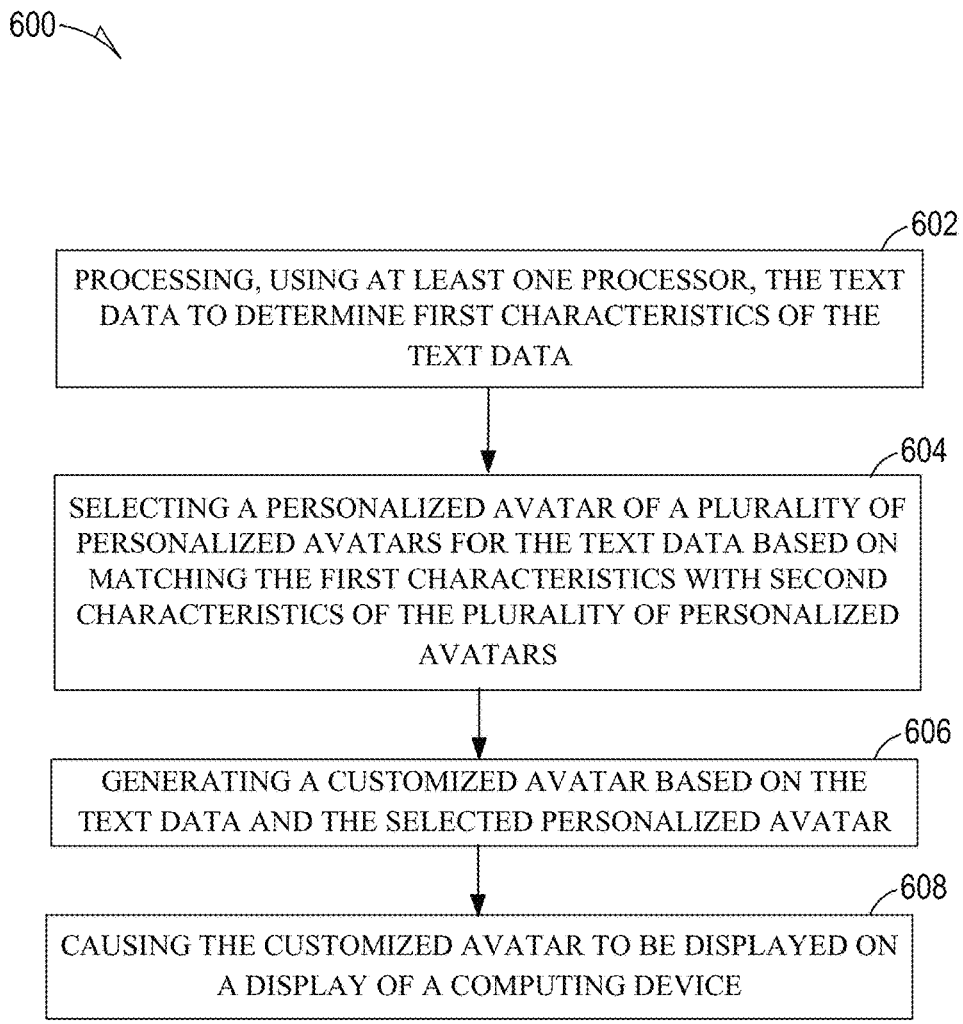
FIG. 6 illustrates a flowchart of a method for generating avatars based on user input in accordance with some examples.

FIG. 6 illustrates a flowchart of a method 600 for generating avatars based on user input in accordance with some examples. While certain operations of the method 600 are described as being performed by certain devices, in different examples, different devices or a combination of devices may perform these operations. For example, operations described below as being performed by the client device 102 may also be performed by or in combination with a server-side computing device (e.g., the message messaging server system 108), or third-party server computing device.

The method 600 begins at operation 602 with processing, using at least one processor, the text data to determine first characteristics of the text data. For example, determine characteristics of text 518 module processes the text data 506 to determine the characteristics 507 using the ML model 520. The characteristics 546 of the personalized avatars 544 are determined by the generate avatars 540 module or the determine characters of avatars 528 module depending on whether the personalized avatar 544 was customize designed or generated by a GAN NN.

The method 600 continues at operation 604 with selecting a personalized avatar of a plurality of personalized avatars with the text data based on matching the first characteristics with second characteristics of the plurality of personalized avatars. For example, avatar-to-text matching module 536 compares the characteristics 507 of the text data 506 and the characteristics 546 of the personalized avatars 544 to determine avatar matches 509, which are the personalized avatars 544 that are the closest matches to the text data 506.

The method 600 continues at operation 606 with generating a customized avatar based on the text data and the selected personalized avatar. The avatar-to-text matching 536 module places the text data 506 in the text placement 549 area of the personalized avatar 544. The avatar adjustment 534 module adjusts the text placement 549 area to fit the text data 506.

The method 600 continues at operation 608 with causing the customized avatar to be displayed on a display of a computing device. For example, the avatar generation system 508 causes one or more of the avatar matches 509 to be displayed on the client device 102 as illustrated in FIG. 8.

One or more of the operations of method 600 may be optional. The method 600 may include one or more additional operations. The operations of method 600 may be performed in a different order, in accordance with some examples.

FIG. 7 illustrates an example of a user interface 700 depicting a base avatar being displayed by client device 102 in accordance with some examples. The user interface 700 includes a user profile button 702, a menu option 704, a base avatar 706, and a user interface 504. As explained above, the base avatar 706 may be any image, video, animation, content collection, ephemeral message, or ephemeral content collection. For illustration purposes, FIG. 7 includes an image of a user of the client device 102 being displayed during an ephemeral chat with another user who is a friend.

The menu option 704, when activated, displays a plurality of menu options, including but not limited to, accessing a friend list, viewing content collection generation scores, viewing rewards, accessing settings, or the like. The user profile button 702 provides access to the user profile of the user of the client device 102, including but not limited to, the username, affinity, user likeness, user mood, duration of online access to content collection, a listing of contacts within a contact database, and the like. The user profile button 702 also allows the user to add additional contacts to the contact database and manage content collections received and/or transmitted between the client device 102 and another computing device connected to the client device 102 via the social network server 124.

The user interface 700 also includes the user input text data 506 which, in one example, is directed to a data field designed to receive user input in the form of an alphanumeric character string that may include icons. The user input text data 706 is an embodiment of user input text data 506. There may be a predetermined limit as to how many characters are permitted within the user input text data 706. The alpha-numeric character string may also be referred to as a chat field that is overlaid or superimposed on top of the media content item while accessing and viewing a content collection or ephemeral message.

FIG. 8 illustrates an example of a user interface 800 depicting an avatar interface 802 and customized avatars being displayed by a client device 102 in accordance with some examples. As depicted beneath the base avatar 706, the avatar interface 802 displays the customized avatars such as customized avatar 1 510, which is a match because of a font size match, customized avatar 2 512, which is a match because of a dimension match, customized avatar 3 514, which is a match because of an alignment match, and customized avatar 4 516, which is a match because of a font match. The personalized avatars 544 that were matched to the text data 506 "Hello Leo" have text placement 549 areas that were compatible with "Hello Leo". For example, each of the personalized avatars 544 selected were designed for two words that were approximately the size of "hello" and "leo". The customized avatars include the user input text data 506 "HELLO LEO" as shown in the user input text data 506.

In one example, if the user chooses, he/she can select from one of the customized avatars 510, 512, 514, or 516 displayed in the avatar interface 802 in order to permit the user to reply to a second computing device. The display may be displaying a media content item from the second user rather than the base avatar 547. A camera icon 804 allows the user to access an integrated camera in the client device 102. The customized avatar extension button 806, in some examples, generates an extended avatar interface containing additional customized avatars that have been generated by the avatar-to-text matching module 536. A previous content collection button 808 permits the users to retrieve previously stored or view content collections. Upon detecting a user gesture, the client device 102 can activate or deactivate the keyboard interface 810.

Figure 9:
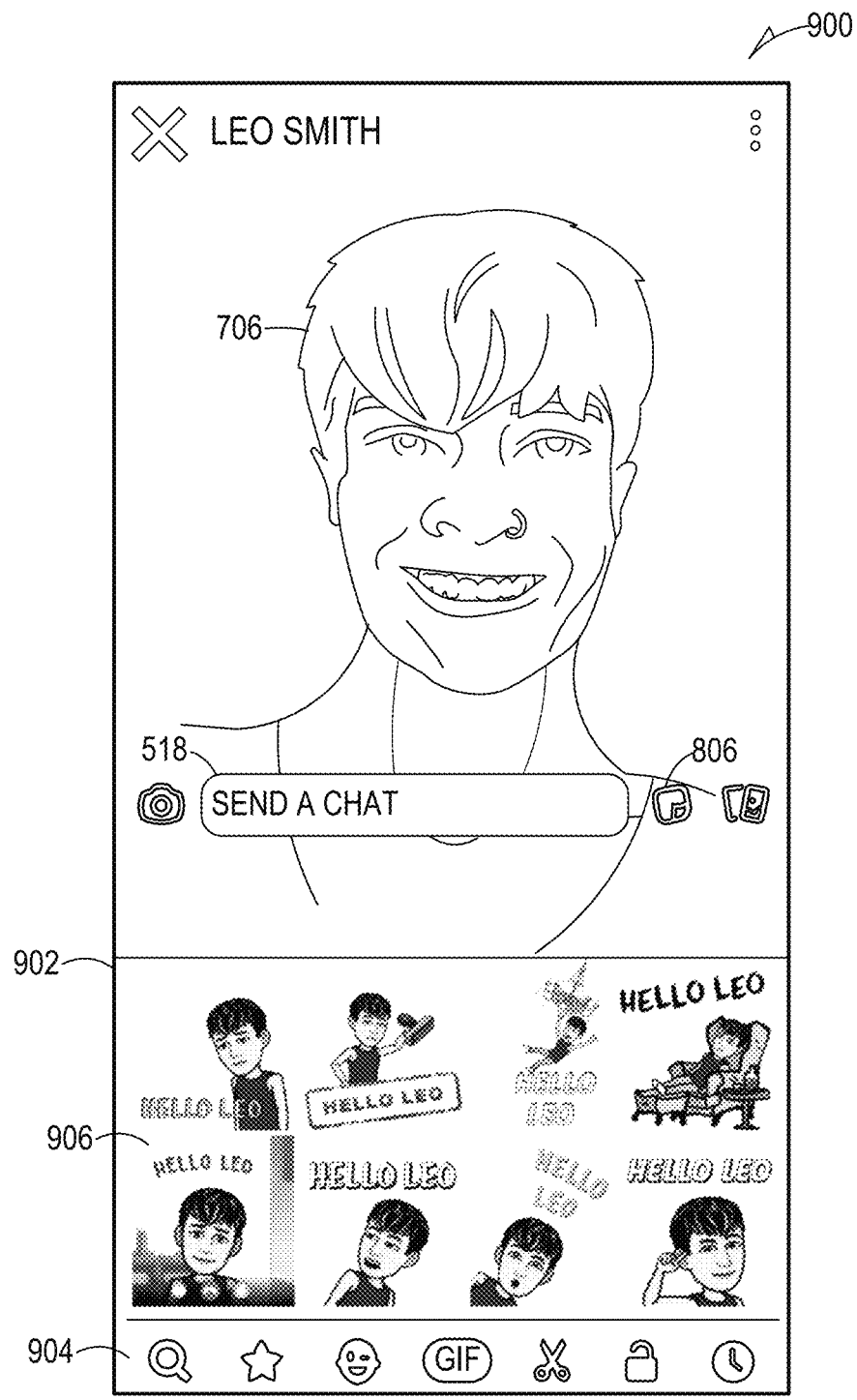
FIG. 9 illustrates an example of a user interface depicting an extendable customized avatar interface being displayed by client device, in accordance with some examples

FIG. 9 illustrates an example of a user interface 900 depicting an extendable customized avatar interface 902 being displayed by client device 102, in accordance with some examples. As shown in FIG. 9, an extendable customized avatar interface 902 is generated based on a user gesture or by activating the customized avatar extension button 806. In one example, the extendable customized avatar interface 902 displays customized avatars generated by the avatar-to-text matching module 536 and can be transmitted by the user of the client device 102 to a second computing device. The avatar-to-text matching module 536 generates more customized avatars by lowering a threshold of a degree of matching with the text data 506. In some examples, the second computing device is another client device connected via the social network server 124 with the client device 102. A content collection toolbar 904 is shown in FIG. 9 contains various design tools that when activated, allow the user to manage the media content item, digital expression objects, media overlay icons, or edit media content items during content collection generation.

Figure 10:
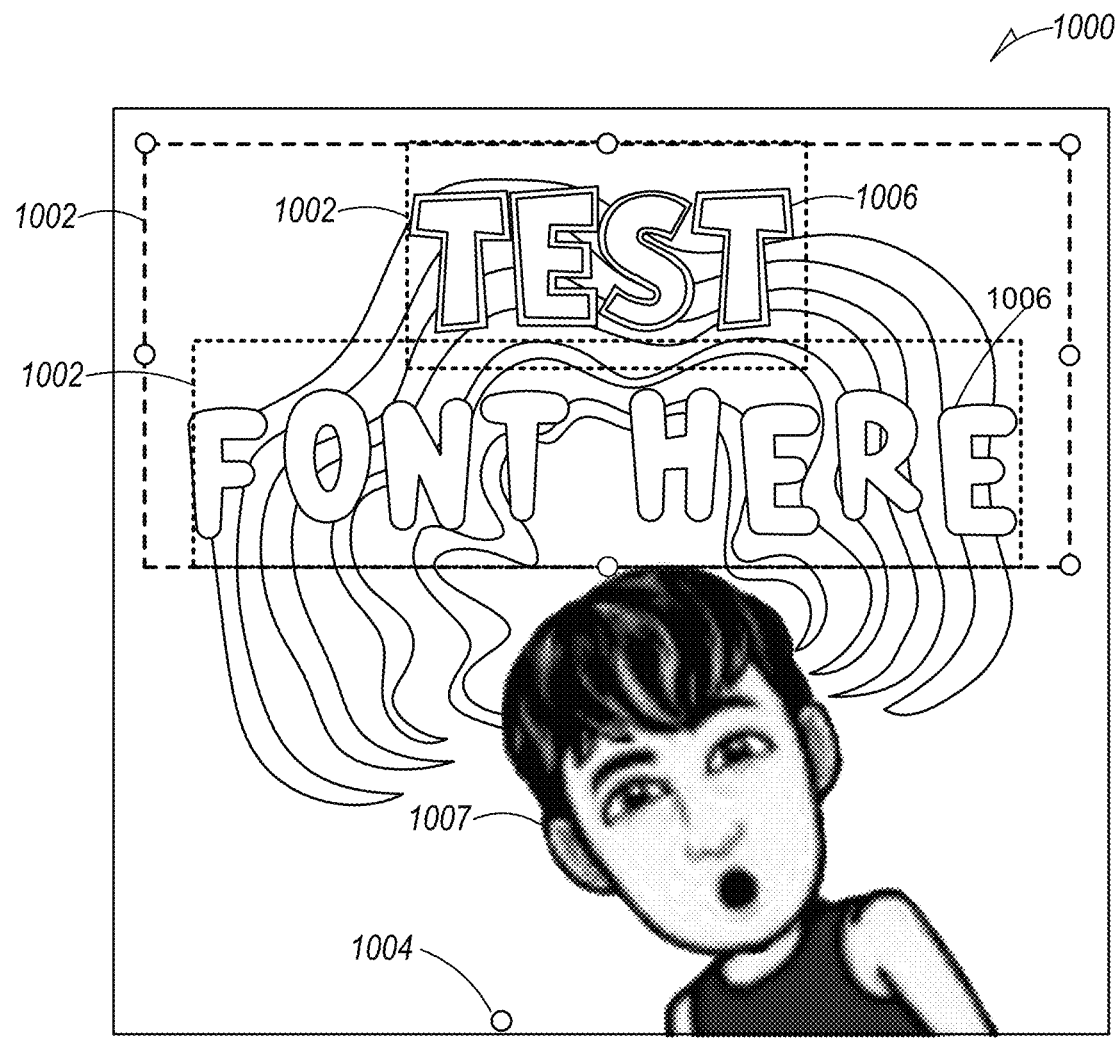
FIG. 10 illustrates an example backend editor interface depicting avatar frame bounding boxes in accordance with some examples.

FIG. 10 illustrates an example backend editor interface 1000 depicting avatar frame bounding boxes in accordance with some examples. As illustrated in FIG. 10, the backend editor interface 1000 includes text boundary boxes 1002 that are positioned around the sample text data 1006 in order to enlarge, scale down, or reposition the sample text data 1006. The text boundary boxes 1002 correspond to the text placement 549 area of the personalized avatar 544. The avatar 1007 is the other portion of the personalized avatar 544. The avatar adjustment 534 module and/or the avatar-to-text matching module 536 adjusts the size or position of the avatar 1007 and/or the size and position of the text boundary boxes 1002 during integration of the user input text data 506 into text placement 549 area. In some examples, the backend editor interface 1000 includes segment buttons 1004 in order to enlarge or shrink the avatar 1007. The sample text data 1006 includes two lines with one word of four letter on the first line and two words with four letter each on the second line.

The avatar adjustment 534 module is configured to manipulate the avatar frame boundary bounding box using segment button 1004 to scale the avatar frame boundary bounding box to a boundary size to accommodate the text data 506. The avatar adjustment 534 module is configured to manipulate text boundary boxes 1002 to accommodate the text data 506. The avatar adjustment 534 module determines whether the text data 506 can or cannot be accommodated by a personalized avatar 544.

Time-Based Access Limitation Architecture

Figure 11:
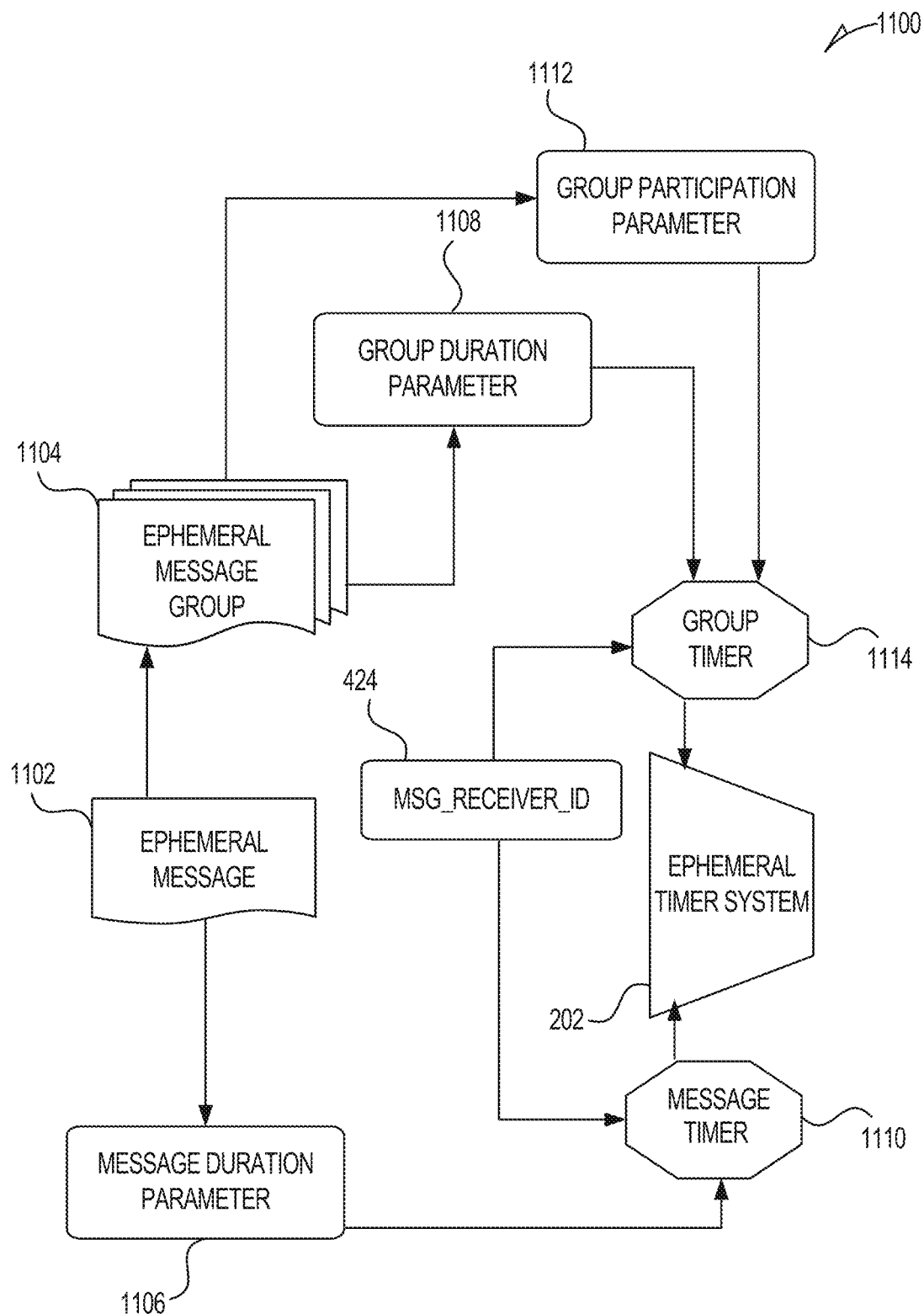
FIG. 11 is a flowchart for an access-limiting process, in accordance with some examples.

FIG. 11 is a schematic diagram illustrating an access-limiting process 1100, in terms of which access to content (e.g., an ephemeral message 1102, and associated multimedia payload of data) or a content collection (e.g., an ephemeral message group 1104) may be time-limited (e.g., made ephemeral).

An ephemeral message 1102 is shown to be associated with a message duration parameter 1106, the value of which determines an amount of time that the ephemeral message 1102 will be displayed to a receiving user of the ephemeral message 1102 by the messaging client 104. In one example, an ephemeral message 1102 is viewable by a receiving user for up to a maximum of 10 seconds, depending on the amount of time that the sending user specifies using the message duration parameter 1106.

The message duration parameter 1106 and the message receiver identifier 424 are shown to be inputs to a message timer 1110, which is responsible for determining the amount of time that the ephemeral message 1102 is shown to a particular receiving user identified by the message receiver identifier 424. In particular, the ephemeral message 1102 will only be shown to the relevant receiving user for a time period determined by the value of the message duration parameter 1106. The message timer 1110 is shown to provide output to a more generalized ephemeral timer system 202, which is responsible for the overall timing of the display of content (e.g., an ephemeral message 1102) to a receiving user.

The ephemeral message 1102 is shown in FIG. 11 to be included within an ephemeral message group 1104 (e.g., a collection of messages in a personal story or an event story). The ephemeral message group 1104 has an associated group duration parameter 1108, a value of which determines a time duration for which the ephemeral message group 1104 is presented and accessible to users of the messaging system 100. The group duration parameter 1108, for example, may be the duration of a music concert, where the ephemeral message group 1104 is a collection of content pertaining to that concert. Alternatively, a user (either the owning user or a curator user) may specify the value for the group duration parameter 1108 when performing the setup and creation of the ephemeral message group 1104.

Additionally, each ephemeral message 1102 within the ephemeral message group 1104 has an associated group participation parameter 1112, a value of which determines the duration of time for which the ephemeral message 1102 will be accessible within the context of the ephemeral message group 1104. Accordingly, a particular ephemeral message group 1104 may "expire" and become inaccessible within the context of the ephemeral message group 1104, prior to the ephemeral message group 1104 itself expiring in terms of the group duration parameter 1108. The group duration parameter 1108, group participation parameter 1112, and message receiver identifier 424 each provide input to a group timer 1114, which operationally determines, firstly, whether a particular ephemeral message 1102 of the ephemeral message group 1104 will be displayed to a particular receiving user and, if so, for how long. Note that the ephemeral message group 1104 is also aware of the identity of the particular receiving user as a result of the message receiver identifier 424.

Accordingly, the group timer 1114 operationally controls the overall lifespan of an associated ephemeral message group 1104, as well as an individual ephemeral message 1102 included in the ephemeral message group 1104. In one example, each and every ephemeral message 1102 within the ephemeral message group 1104 remains viewable and accessible for a time period specified by the group duration parameter 1108. In a further example, a certain ephemeral message 1102 may expire within the context of ephemeral message group 1104, based on a group participation parameter 1112. Note that a message duration parameter 1106 may still determine the duration of time for which a particular ephemeral message 1102 is displayed to a receiving user, even within the context of the ephemeral message group 1104. Accordingly, the message duration parameter 1106 determines the duration of time that a particular ephemeral message 1102 is displayed to a receiving user, regardless of whether the receiving user is viewing that ephemeral message 1102 inside or outside the context of an ephemeral message group 1104.

The ephemeral timer system 202 may furthermore operationally remove a particular ephemeral message 1102 from the ephemeral message group 1104 based on a determination that it has exceeded an associated group participation parameter 1112. For example, when a sending user has established a group participation parameter 1112 of 24 hours from posting, the ephemeral timer system 202 will remove the relevant ephemeral message 1102 from the ephemeral message group 1104 after the specified 24 hours. The ephemeral timer system 202 also operates to remove an ephemeral message group 1104 when either the group participation parameter 1112 for each and every ephemeral message 1102 within the ephemeral message group 1104 has expired, or when the ephemeral message group 1104 itself has expired in terms of the group duration parameter 1108.

In certain use cases, a creator of a particular ephemeral message group 1104 may specify an indefinite group duration parameter 1108. In this case, the expiration of the group participation parameter 1112 for the last remaining ephemeral message 1102 within the ephemeral message group 1104 will determine when the ephemeral message group 1104 itself expires. In this case, a new ephemeral message 1102, added to the ephemeral message group 1104, with a new group participation parameter 1112, effectively extends the life of an ephemeral message group 1104 to equal the value of the group participation parameter 1112.

Responsive to the ephemeral timer system 202 determining that an ephemeral message group 1104 has expired (e.g., is no longer accessible), the ephemeral timer system 202 communicates with the messaging system 100 (and, for example, specifically the messaging client 104) to cause an indicium (e.g., an icon) associated with the relevant ephemeral message group 1104 to no longer be displayed within a user interface of the messaging client 104. Similarly, when the ephemeral timer system 202 determines that the message duration parameter 1106 for a particular ephemeral message 1102 has expired, the ephemeral timer system 202 causes the messaging client 104 to no longer display an indicium (e.g., an icon or textual identification) associated with the ephemeral message 1102.

Machine Architecture

Figure 12:
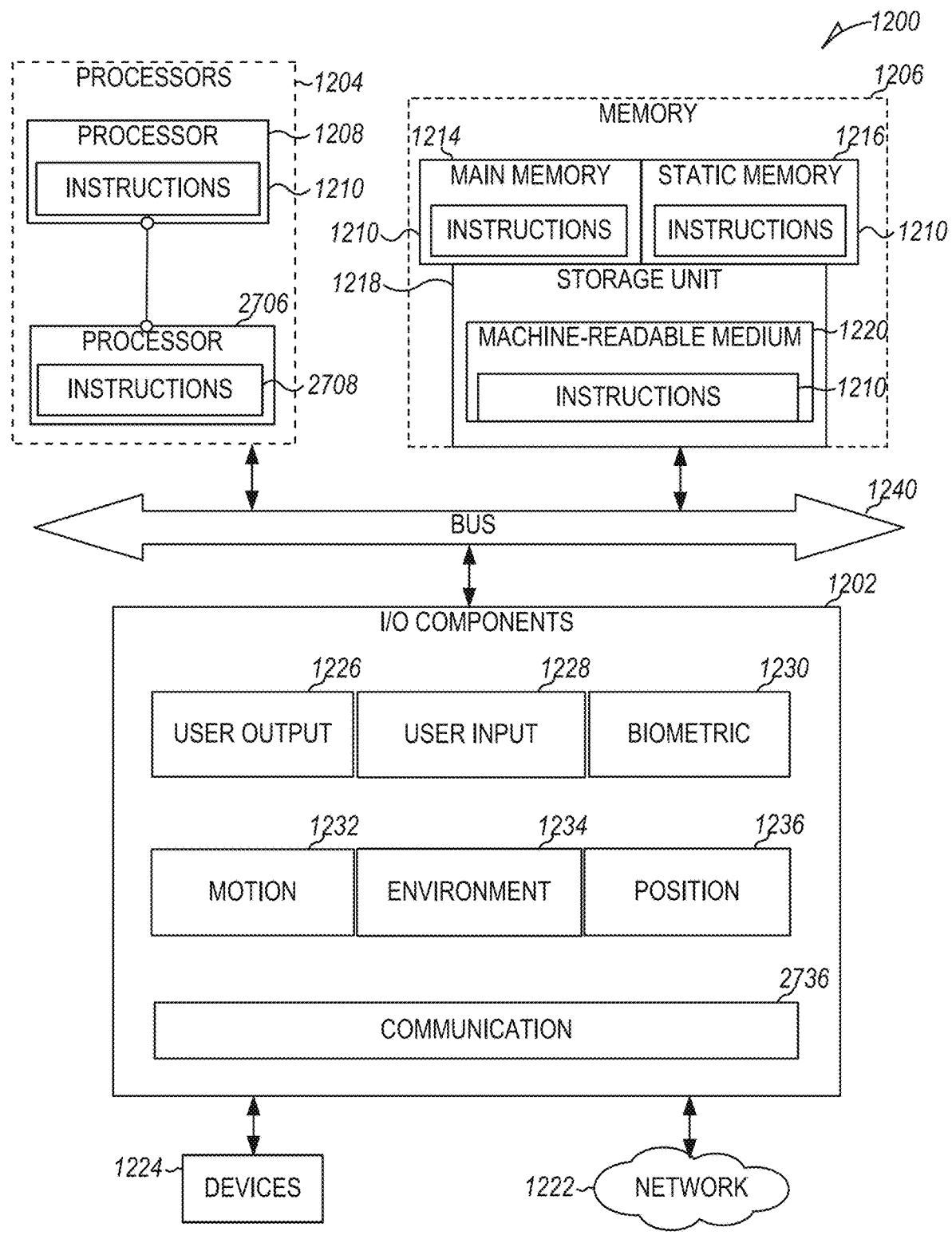
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1210 (e.g., software, a program, an application, an applet, an app, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein. The machine 1200, for example, may comprise the client device 102 or any one of a number of server devices forming part of the messaging server system 108. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1202, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the Processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface Component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Software Architecture

Figure 13:
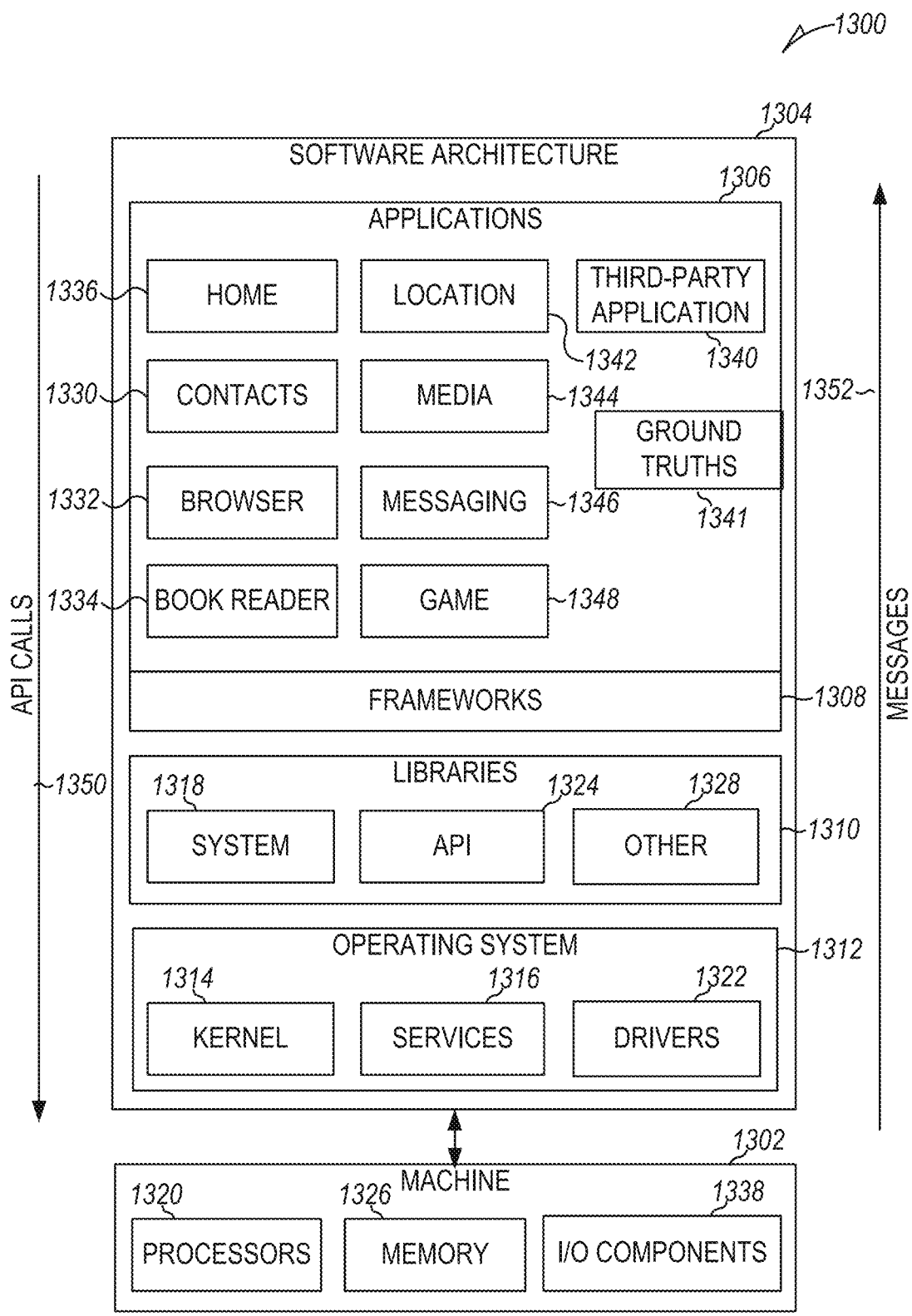
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Processing Components

Figure 14:
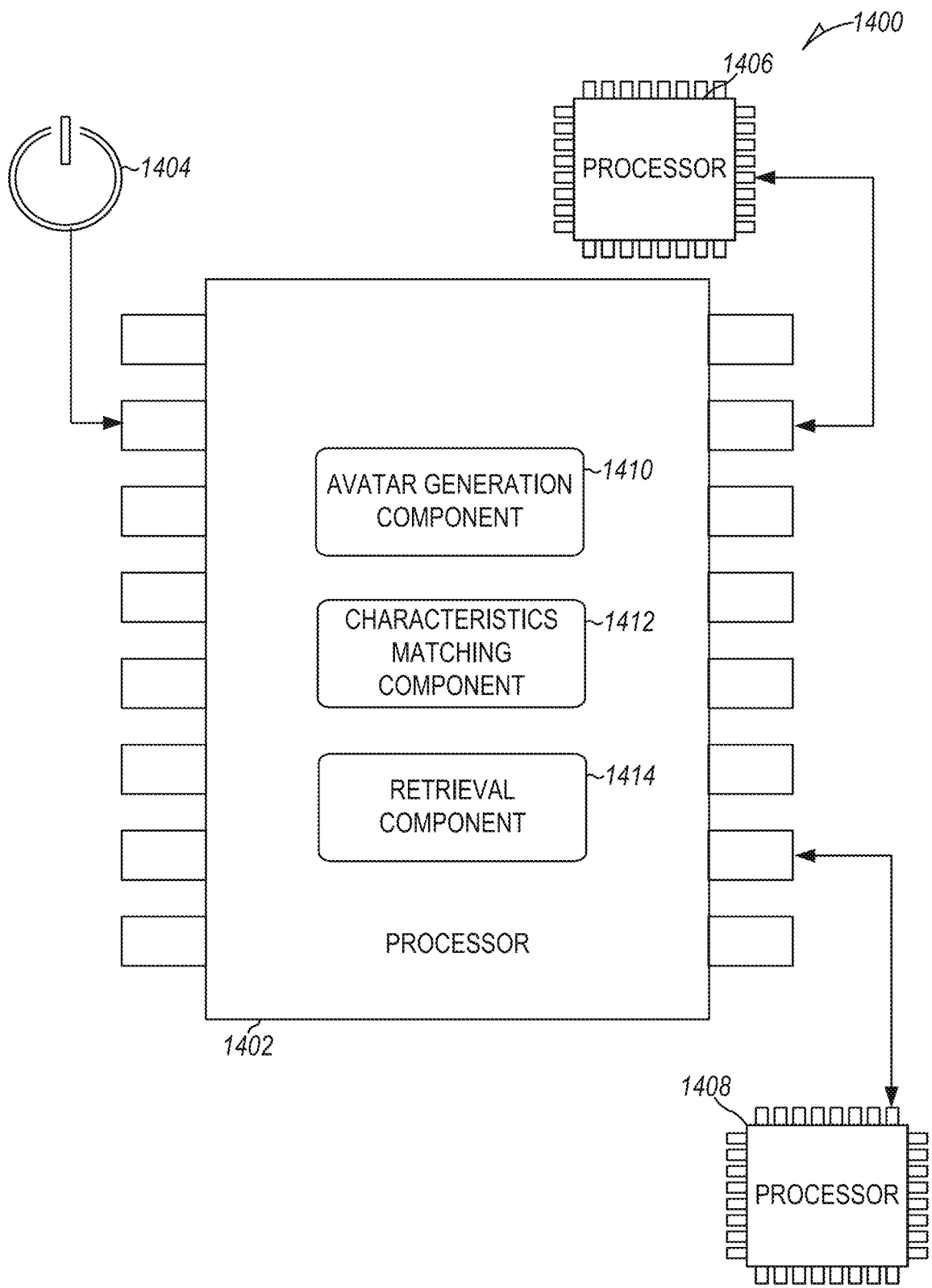
FIG. 14 is a diagrammatic representation of a processing environment, in accordance with some examples.

Turning now to FIG. 14, there is shown a diagrammatic representation of a processing environment 1400, which includes a processor 1402, a processor 1406, and a processor 1408 (e.g., a GPU, CPU or combination thereof).

The processor 1402 is shown to be coupled to a power source 1404, and to include (either permanently configured or temporarily instantiated) modules, namely an avatar to text matching component 1410, a determine characteristics of avatar and text component 1412, and an avatar adjustment component 1414. The avatar to text matching component 1410 performs the functions of avatar-to-text matching module 536 as discussed in conjunction with FIG. 5. The avatar to text matching component 1410 selects personalized avatars that are a best match for text data the user has input. The determine characteristics of avatar and text component 1412 performs the functions of determine characteristics of avatars 528 and determine characteristics of text 518 where personalized avatars and text data are analyzed for evaluating their characteristics. The avatar adjustment component 1414 incorporates text data input by a user into a personalized avatar of the user to generate a customized avatar the user can include in a communication to another user or for another purpose. As illustrated, the processor 1402 is communicatively coupled to both the processor 1406 and the processor 1408.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    accessing text data;
    inputting the text data into one or more first neural networks trained to classify the text data for each of the first characteristics, wherein first outputs of the one or more first neural networks indicate probabilities that the text data has each of the first characteristics;
    generating, using a generative adversarial network (GAN) neural network (NN), a plurality of personalized avatars based on second characteristics and a base avatar, each of the personalized avatars comprising a text placement area;
    inputting the plurality of personalized avatars into one or more second neural networks trained to classify the plurality of personalized avatars for each of the second characteristics, wherein second outputs of the one or more second neural networks indicate probabilities that each of the plurality of personalized avatars has each of the second characteristics
    selecting a personalized avatar of the plurality of personalized avatars for the text data based on matching the probabilities that each of the plurality of personalized avatars has each of the second characteristics with the probabilities that the text data has each of the first characteristics, and based on the text placement area of the selected personalized avatar being able to accommodate the text data;
    generating a customized avatar based on the text data and the selected personalized avatar; and
    causing the customized avatar to be displayed on a display of a computing device.

2. The method of claim 1 wherein the generating further comprises:
    inserting the text data into the text placement area of the selected personalized avatar.

3. The method of claim 1 wherein the first characteristics of the text data comprise one or more of the following: a font type, a font spacing value, and a font size.

4. The method of claim 3 wherein the first characteristics further comprise one or more of the following: a syntax, a number of letters, a number of words, a sentiment, number of lines, special characters, icons, a grammar, a meaning of the text, a phrase, a title, a slogan, an action, a mood, an emotion, a greeting, an event, a place, and an object.

5. The method of claim 1 wherein the second characteristics comprise one or more of the following: a font type, a font spacing value, and a font size.

6. The method of claim 5 wherein the second characteristics further comprise one or more of the following: a syntax, a number of letters, a number of words, a sentiment, number of lines, special characters, icons, a grammar, a meaning of the text, a phrase, a title, a slogan, an action, a mood, an emotion, a text placement area size, a greeting, an event, a place, and an object.

7. The method of claim 1 further comprising:
    accessing a selection of the selected customized avatar by a first user;
    accessing a selection to send the customized avatar to a second user using a messaging system; and causing the customized avatar to be sent to the second user.

8. The method of claim 1 wherein the personalized avatar comprises: an image, a video, a digital photo, a content collection, or virtual reality digital representation, a mixed reality digital representation, a mixed reality graphical representation, or a three-dimensional digital representation.

9. A system comprising:
one or more processors; and
a memory storing instructions that, when executed by the one or more processors, configure the system to perform operations comprising:
accessing text data;
inputting the text data into one or more first neural networks trained to classify the text data for each of the first characteristics, wherein first outputs of the one or more first neural networks indicate probabilities that the text data has each of the first characteristics;
generating, using a generative adversarial network (GAN) neural network (NN), a plurality of personalized avatars based on second characteristics and a base avatar, each of the personalized avatars comprising a text placement area;
inputting the plurality of personalized avatars into one or more second neural networks trained to classify the plurality of personalized avatars for each of the second characteristics, wherein second outputs of the one or more second neural networks indicate probabilities that each of the plurality of personalized avatars has each of the second characteristics
selecting a personalized avatar of the plurality of personalized avatars for the text data based on matching the probabilities that each of the plurality of personalized avatars has each of the second characteristics with the probabilities that the text data has each of the first characteristics, and based on the text placement area of the selected personalized avatar being able to accommodate the text data;
generating a customized avatar based on the text data and the selected personalized avatar; and
causing the customized avatar to be displayed on a display of a computing device.

10. A non-transitory computer-readable storage medium, the non-transitory computer-readable storage medium including instructions that when executed by a computer, cause the computer to perform operations comprising:
accessing text data;
inputting the text data into one or more first neural networks trained to classify the text data for each of the first characteristics, wherein first outputs of the one or more first neural networks indicate probabilities that the text data has each of the first characteristics;
generating, using a generative adversarial network (GAN) neural network (NN), a plurality of personalized avatars based on second characteristics and a base avatar, each of the personalized avatars comprising a text placement area;
inputting the plurality of personalized avatars into one or more second neural networks trained to classify the plurality of personalized avatars for each of the second characteristics, wherein second outputs of the one or more second neural networks indicate probabilities that each of the plurality of personalized avatars has each of the second characteristics
selecting a personalized avatar of the plurality of personalized avatars for the text data based on matching the probabilities that each of the plurality of personalized avatars has each of the second characteristics with the probabilities that the text data has each of the first characteristics, and based on the text placement area of the selected personalized avatar being able to accommodate the text data;
generating a customized avatar based on the text data and the selected personalized avatar; and
causing the customized avatar to be displayed on a display of a computing device.

11. The non-transitory computer-readable storage medium of claim 10 wherein the operations further comprise:
inserting the text data into the text placement area of the selected personalized avatar.

* * * * *